Patented Jan. 12, 1937

2,067,261

UNITED STATES PATENT OFFICE 2,067,261

ORGANIC SULPHUR COMPOUND AND PROCESS OF MAKING THE SAME

John Delson, New York, N. Y., assignor to Flint & Co., Inc., a corporation of New York No Drawing. Application January 19, 1931, Serial No. 509,891

9 Claims. (Cl. 260—138)

My invention, which includes both a process and a product, relates to an organic substance that is produced from the combination of a glycerine with sulphur.

It is commonly known that organic compounds are more effective in the treatment of certain diseases than inorganic compounds. The sulphur compounds in use at the present time are inorganic and are not highly germicidal.

It is therefore an object of my invention to produce a definite organic sulphur compound which is germicidal and non-poisonous.

A further object of my invention, is by submitting glycerine and sulphur in suitable proportions to proper temperature and pressure, and by regulating the cooling thereof to produce a liquid compound, which after cooling will remain a liquid indefinitely.

A further object of my invention is, by submitting glycerine and sulphur in the proportion of about 1 part sulphur to 32 parts glycerine to a temperature of about 350° to 400° Fahrenheit of heat under a pressure of about 20 pounds and by regulating the cooling of the resultant compound to produce a product having the characteristics and properties of sulphur aldehyde.

A further object of my invention resides in the synthetic production of an organic sulphur compound.

A further object of my invention resides in the production of an organic sulphur compound by combining an aldehyde with sulphur.

It is a well known fact that sulphur is practically insoluble, that is, when it is heated, it may be melted, but immediately upon cooling, it solidifies again.

A characteristic property of glycerine is that of yielding an exceedingly pungent and irritating substance, known as acrolein, or acrylic aldehyde, $C_2H_3 \cdot CHO$, when sharply heated, or subjected to the action of dehydrating agents.

The substances used in an embodiment of my invention, are powdered washed sulphur and glycerine. By experiment, I have found that by taking powdered sulphur and mixing it with glycerine in suitable proportions, for example, 1 part of sulphur and 32 parts of glycerine in a crucible which is not hermetically sealed and subjecting the mixture to heat, the resultant physical compound is clear, but, on cooling, crystals of sulphur are precipitated and after filtering the liquid turns cloudy with a floccular precipitate, the liquid containing an indefinite quantity of sulphur vapor. Upon analyzing the liquid it was found to contain a small quantity of inorganic sulphur. I have found that changing the quantities of the materials does not alter the phenomenon.

The results which I brought about indicated that since the mixture contained sulphur in suspension, with traces of inorganic sulphur, that with the proper manipulation of temperature and pressure the necessary chemical change could be produced to form an organic compound.

Acting upon this presumption I provided a heat-resisting crucible or retort preferably made of steel or iron, and having its inner surface coated with enamel and furnished the crucible with an outlet or safety valve, charged the crucible with sulphur and glycerine mixed in substantially the following proportions: 1 part of sulphur and 32 parts of glycerine by weight. The lid of the crucible was then sealed and the mixture within the crucible subjected to a temperature of from 350° to 400° Fahrenheit of heat under a pressure of about 20 pounds. This developed pressure was due to the partial vaporization of the content of the crucible.

The temperature was raised slowly by regulating the flames under the crucible. I found that in order to produce the best results, it should take from about one and one-half hours to two hours for the content of the crucible to attain a temperature of 350° to 400° Fahrenheit. When the mixture attained the temperature of 350° to 400° Fahrenheit, the mix vaporized and after passing through the valve and upon ignition with the air gave off a blue flame. Thereafter the said heat was maintained for about ten minutes and the crucible removed from the flame and the resultant compound was allowed to remain within the crucible for a period of about twenty-four hours, in order to obtain the best results, during which time the resultant vapor liquefied. When the material was taken from the crucible or retort it was found to be a liquid.

The content of the retort combined chemically through the instrumentality of the applied heat and the pressure created by vaporization of the content.

It is understood that partial vaporization of the content takes place.

Great difficulty had been experienced in obtaining the proper proportions of the materials and determining the proper heat and pressure to which the materials were to be subjected in order to produce a definite organic sulphur compound.

By obtaining the proper proportions of an inorganic substance and an organic substance, in this case, the substances being sulphur and glycerine, and subjecting the mixture to proper heat and pressure, a definite organic sulphur compound results.

This compound has the characteristics and properties of sulphur aldehyde, the chemical formula for which is:

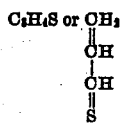

The probable chemical changes which take place by my process, are as follows:

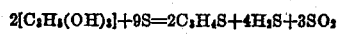

My compound may be known as thioacrolein.

I have found that the temperature and pressure may each be varied within about 25% more or less of that given hereinabove without appreciably affecting the result. It would seem that the sulphur interacts with part of the glycerine content during the process, the resulting compound being probably an organic sulphur product in glycerine solution. By changing the proportions of materials or varying the technique, stronger or weaker solutions may be obtained.

To produce the resulting composition in ointment form, I found it preferable to add from 10% to 25% of the compound to petrolatum or any other ointment base.

I have found that the above resulting compound has various uses in its application for skin troubles.

By taking a suitable liquid compound internally, the same may also be used for the treatment of arthritis and neuritis and similar diseases.

The above compound may also be used in the bath for treatment of skin diseases and rheumatism. It is highly germicidal and non-poisonous.

While I have described a preferred embodiment of my invention, I am aware that other modifications may be made and I, therefore, desire a broad interpretation of the invention within the scope and spirit herein and the claims appended hereto.

By my invention I have produced an organic thio compound showing an aldehyde reaction with phenylhydrazine and ammonical silver nitrate and being unsaturated as shown by the bromine absorption; also a mixture consisting of glycerine and an organic thio compound soluble in water, the compound being non-distilling at least up to 500° Fahrenheit at atmospheric pressure.

Having thus described my invention, what I claim as new and desire to secure by Letters Patent is:—

1. A process of producing thioacrolein consisting of heating sulphur and glycerine to a temperature of 260 to 450° F. under a pressure of about 20 pounds per square inch.

2. The compound, thioacrolein.

3. A mixture consisting of thioacrolein in glycerine.

4. A process of producing unsaturated and water soluble thioaldehyde that is non-distilling up to at least 500° Fahrenheit at atmospheric pressure which consists in mixing sulphur and glycerine, and applying heat to the mix to raise the temperature thereof to approximately from 260° to 450° Fahrenheit and at a pressure obtained under said conditions in a closed vessel.

5. A process for producing a sulphur compound consisting of mixing sulphur and glycerine, and heating the mixture in a sealed container to a temperature approximately from 260° to 450° Fahrenheit and at a pressure obtained under said conditions in a closed vessel.

6. A process for producing sulphur compound in liquid form, consisting of mixing sulphur and gylcerine and heating the mixture in a sealed container to a temperature approximately from 260° to 450° Fahrenheit, and subjecting the same to slow cooling to complete the reaction and at a pressure obtained under said conditions in a closed vessel.

7. A process for producing an organic sulphur compound consisting of mixing sulphur and glycerine and heating the mixture under pressure to a temperature of approximately from 260° to 450° Fahrenheit and at a pressure obtained under said conditions in a closed vessel.

8. A mixture containing glycerine and unsaturated thioaldehyde derived from the reaction of sulphur with gylcerine at approximately 450° Fahrenheit, and under a pressure of approximately 20 pounds, said thioaldehyde being soluble in water and non-distilling to at least 500° Fahrenheit at atmospheric pressure.

9. An organic thio compound derived from the reaction of sulphur with glycerine at approximately 450° Fahrenheit, and under a pressure of approximately 20 pounds, said thio compound being soluble in water and non-distilling to at least 500° Fahrenheit at atmospheric pressure and showing an aldehyde reaction with phenylhydrazine and ammonical silver nitrate and being unsaturated as shown by the bromine absorption.

JOHN DELSON.